(12) United States Patent
Hohl et al.

(10) Patent No.: US 7,573,855 B2
(45) Date of Patent: Aug. 11, 2009

(54) DEVICE REGISTRATION IN A WIRELESS MULTI-HOP AD-HOC NETWORK

(75) Inventors: Fritz Hohl, Stuttgart (DE); Ernoe Kovacs, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 335 days.

(21) Appl. No.: 10/588,531

(22) PCT Filed: Aug. 12, 2004

(86) PCT No.: PCT/EP2004/009057
§ 371 (c)(1),
(2), (4) Date: Aug. 7, 2006

(87) PCT Pub. No.: WO2005/079036
PCT Pub. Date: Aug. 25, 2005

(65) Prior Publication Data
US 2007/0184837 A1      Aug. 9, 2007

(30) Foreign Application Priority Data
Feb. 18, 2004   (EP) .................................. 04003647

(51) Int. Cl.
*H04W 4/00* (2009.01)
*H04B 7/00* (2006.01)

(52) U.S. Cl. .................... 370/338; 455/435.1; 455/41.2

(58) Field of Classification Search ................. 370/338; 455/63.4, 572, 41.2, 435.1
See application file for complete search history.

(56) References Cited

U.S. PATENT DOCUMENTS 6,630,883 B1 * 10/2003 Amin et al. ................. 340/7.29
2004/0266347 A1 * 12/2004 Palin et al. .................. 455/41.1

FOREIGN PATENT DOCUMENTS

DE          100 39 954       2/2002

\* cited by examiner

*Primary Examiner*—Nick Corsaro
*Assistant Examiner*—Michael Mapa
(74) *Attorney, Agent, or Firm*—Oblon, Spivak, McClelland, Maier & Neustadt, P.C.

(57) ABSTRACT

A wireless multi-hop ad-hoc network in which a wireless communication device is enabled to register with a multi-hop network in a secure and easy-to-use way. In one implementation a user's wireless communication device is registered before allowing the device to enter a wireless multi-hop ad-hoc network and the device participates in communication with wireless nodes connected to the network. For this purpose, the device wirelessly transmits a registration request message to all the wireless nodes and determines the nearest wireless node in its environment being authorized to register the device to the network by evaluating wirelessly received response messages from the nodes.

8 Claims, 4 Drawing Sheets

|  | WLAN (adhoc) | Bluetooth | FEEL | DECT | Smart-Its Friends | Invention |
|---|---|---|---|---|---|---|
| secure? | yes | yes | yes | yes[1] | not specified | yes |
| easy-to-use: which user interaction is needed in the best case | entering a name and a key | entering a key | moving two devices together | select from a list & entering a key | do the same action to two devices | press a button at two devices |
| multiple networks supported? | yes | yes | yes | yes (multiple base stations) | yes | yes |
| low probability of unwanted registration? | yes | yes | no | yes | despends on the used actions | yes |
| required additional hardware means | entering strings | entering strings | none | selection from a text list, entering strings | context sensors | AV, buttons |
| self-contained registration for which device types? | >=mobile phones | >=mobile phones | mobile devices only | >=mobile phones | yes(but despends on the used actions) | all |

[1] If the PIN is the factory default value, an attacker can register with the base station during the 20s period starting when the "Paging" button is pressed. During this time, an attacker could also mask as a base station.

Fig. 1

DEVICE REGISTRATION IN A WIRELESS MULTI-HOP AD-HOC NETWORK

FIELD AND BACKGROUND OF THE INVENTION

The present invention refers to the field of device registration in a wireless network wherein wireless communication devices shall be allowed to participate to the network in a secure and easy-to-use way.

In the field of wireless multi-hop ad-hoc networks the registration process describes how new devices are allowed to participate to a network. This process contains four roles: a wireless communication device that wishes to participate to the network ("requesting node"), a node connected to the network that decides whether to allow the "requesting node" to participate to the network or not ("allowing node"), a "user" who, in some registration variants, sanctions the registration, and a possible "attacker" being able to interfere and to read messages exchanged between the "requesting node" and the "allowing node" during the authentication and registration process. The problems involved with the registration process arise from its requirements that stem from different areas, namely the technical area, the human usage area, and the economic area.

An ideal registration process has to fulfill the following requirements:

Security: For achieving security of registration, the following requirements have to be fulfilled. First, the registering device and the device a user wants to be registered have to be identical. Thereby, the user specifies a device to be a "requesting node". When the registration process is finished and a new device can now participate to the network, it must be the device specified by the user and not another device. This requirement is important because the membership to a network might be associated with certain rights such as knowing sensitive data or being able to use certain resources. Second, the network the "requesting node" wants to be registered to and the network it is registered to have to be identical. The user thereby specifies the network the "requesting node" shall participate to. When the registration process is finished, the "requesting node" shall participate in the specified network, not another one. This requirement is important because other members of the network might also have certain rights on the new device. Third, masking attacks have to be precluded. While a "requesting node" might later on be connected to the current network and the node itself might be specified by the user, an attack might be possible where an attacker between the "requesting node" and the network relays the messages between these parties, thus being able to interfere and to read the communication. Fourth, an attacker must not be able to mask after the registration process as one of the participating nodes in the network.

Ease of use: In order to also allow users without special computer skills to do the registration (thus broaden the market for corresponding devices), a user interface for controlling the registration process has to be easy to use. This means that user actions to be executed should be easy to understand, easy to remember, and easy to execute.

Support of multiple networks: The registration process should be able to cope with the existence of multiple networks, e.g. in case a node is currently in a network A and wants to register with a network B.

Low probability of an unwanted registration: Especially in case of multiple networks, there might be the situation that the device is in a network A and suddenly comes also into the range of another network B (e.g. when a user carrying a mobile device is walking in a train). In these situations the registration process should not automatically start, thus either automatically entering network B or putting a burden on the user to cancel a registration.

Minimal additional hardware means: In order to have lower production costs, hardware means that are needed for the registration process and that would not be a part of the device without the registration should be minimal.

Self-contained devices: Finally, in order to allow also wireless ad-hoc networks of devices without the user interactions means of PCs or PDAs, said registration should be done using existing means in these devices themselves. This means that the devices should be self-contained in terms of registration.

BRIEF DESCRIPTION OF THE PRESENT STATE OF THE ART

WLAN (ad-hoc mode): If the secure mode in the ad-hoc mode of 802.11-like wireless networks is used, a network name and a cryptographic key protect the network. In order to participate to the network which is protected in this way, the network name and the key have to be configured at the "requesting node". There is also the possibility to participate in a network without the need for any configuration. As a consequence, there is no cryptographic protection such that the default network name has to be used. Therefore, the resulting network is not secure, and multiple networks are not supported.

Bluetooth: The registration (also called "pairing" as it is a relation between two devices in the Bluetooth area) requires to type in a user-selected passcode to both devices before they can be paired. While this solution is reasonably secure, it requires the user to know how pairing works to find the pairing control in each of the two devices and to enter the passcode in each of the devices. To this end, each device needs a means to enter at least a number. Pairing can also be switched off, which results in a network that is not secured in this aspect.

DECT: In DECT (see "T-Sinus 512. Das schnurlose Telefon. Mit SMS" (Deutsche Telekom, Handbuch zum DECT-Telefon T-Sinus 512, 10/2002 for a handbook of a typical contemporary DECT system), a wireless network technology, a base station and a mobile phone register by choosing the base station by selecting its name in a list of base station names and entering the PIN number of the base station at the mobile phone. By pressing a 'paging' button at the base station, all mobile phones registered at this base station ring.

OBJECT OF THE PRESENT INVENTION

It is the object of the present invention to provide a registration technique which allows wireless devices to participate to a wireless multi-hop ad-hoc network in a secure and easy-to-use manner.

This object is achieved by means of the features of the independent claims. Advantageous features are defined in the dependent claims. Further objects and advantages of the invention are apparent in the detailed description which follows.

SUMMARY OF THE INVENTION

The present invention is basically dedicated to a method for registering a user's wireless communication device to a wireless multi-hop ad-hoc network and authenticating said user's identity before allowing said device to enter the network and participate in communication with wireless nodes connected to the network. For this registration process the invention allows a user to audio-visually verify the identity of the mobile or fixed device to be registered and of a mobile or immobile node that shall allow the device to register to the network.

To solve the registration problem described above, each device participating in a wireless network scenario comprises five components: a wireless communication unit (WCU), a distance measurement unit (DMU), an audio/video output unit (AVOU), a user interaction unit (UIU), and a registration control unit (RCU). As the network is wireless, each device contains a WCU that provides the communication between the devices. The DMU is able to determine the distances of the local device to the other devices in the wireless multi-hop ad-hoc network. The AVOU is able to play out a number of different signals. These signals may consist of a series of different audible elements, visible elements, or both. The UIU allows the user to start a number of actions and to experience a variety of different states the device is in. These actions comprise: entering a network without being in a network before, changing the network, querying the own current network, accepting a query of another device that wants to join to the own network, rejecting a query of another device which wants to join to the own network, and creating a new network. The RCU, finally, controls the entire registration process from the viewpoint of the respective device.

When the user starts the action "enter network without being in a network before" or the action change network, at the UIU of the "requesting node", the RCU uses the DMU and the WCU to determine the nearest "allowing node". The RCU uses the WCU to send a registration request message to this "allowing node".

In order to make the registration process secure, only one registration process in one environment (i.e. a network plus all "requesting nodes" around this network) is allowed at a time. In order to achieve that, the RCU of the "requesting node" starts the protocol that ensures that only one registration process is running. This protocol sends messages to all nodes in the environment. After having ensured this, the registration process is continued. From this point of time on only the "requesting node" with which the currently allowed registration process is associated is accepted by the other devices participating in the registration process.

The RCU of the "allowing node" sends back a start test message to the RCU of the "requesting node" using the WCU. Then, the "allowing node" plays out an audio-visual signal by using its AVOU. After having received and decrypted the start test message, the "requesting node" also plays out a signal by using its AVOU. A user is thus able to verify that a signal is played out both at the "allowing node" and at the "requesting node".

Optionally, instead of merely using possibly different signals at the "allowing node" and the "requesting node", both nodes play out the same signal out of a broad range of possible signals, where "same" signal might refer to two different signals the user can recognize as a match.

If this is the case, the user starts the action "accept query of another device to join my network" at the "allowing node". In this case, the RCU of the "allowing node" accepts the "requesting node" to the network of the "allowing node". The RCU then sends an acceptance message to the RCU of the "requesting node" by using the WCU.

In principle now the "requesting node" could enter the network, i.e. act as a member. However, a special security problem can arise then. This special security problem consists of a scenario, where the control logic selected a node as the "allowing node" that is a member of the near-by network of an attacker. The "requesting node" and the node in the attacker network play out the audio-visual signal. The attacker presses the registration button at the "allowing node" in the attacker network and the "requesting node" is now a member of the attacker network. This hurts the security requirement, and the nodes in the attacker network might access resources of the "requesting node".

Therefore, in order to prevent this security problem, the "requesting node" has to ask the user for a final sanction of the registration by awaiting the user starting the action "enter network without being in a network before" at the UIU of the "requesting node" again. To that end the "requesting node" signals to the user via the UIU that a final action is needed, e.g. by letting a button flash. The user now decides whether he/she starts the action "enter network without being in a network before" (if he/she really sanctioned the registration at the "allowing node") or whether he/she simply waits some time until the UIU informs the user that another registration attempt can be done.

In case of no user action in this time interval the "requesting node" removes all membership data and selects the next node as the "allowing node". In this case, the "requesting node" cancels the registration attempt, and sends the registration request message to the new "allowing node" and continues as described above. In case the user pressed the button a second time, the registration process is now finished, and the "requesting node" is a part of the same network as the "allowing node".

If there is a signal played out at the "allowing node" and none at the "requesting node", the user does not start any further action. In this case, the RCU of the "requesting node" registers the lack of an acceptance or rejection message after a certain time interval and stops the registration process. In this case, the RCU of the "allowing node" also registers the lack of a user action after said time interval and stops the registration process. The registration process is now finished, and the "requesting node" is not part of the same network as the "allowing node".

If there is a signal played out at the "requesting node" and none at the "allowing node" the user intends to use, the user can press the action "enter network without being in a network before" or the action "change network" at the UIU of the "requesting node" again, thus selecting the second-nearest node as "allowing node". In this case, the "requesting node" uses the protocol to cancel the registration, then continues with sending the now "allowing node" a registration request message and continues as described above. The user repeats this process until he/she sees and/or hears the signal played out at the "allowing node" the user wants to use. If the user does not start the action, the registration process times out as described above.

When the registration process is finished, the RCU of the "requesting node" uses the protocol to signal to the environment that the registration process is finished and that now other registration processes can be started.

The most advantageous difference between the invention and the state of the art is that the present invention provides an effortless registration of a new device into the network while maintaining given security guarantees. From a commercial point of view this is an extremely important aspect for future wireless networks. In contrast to the prior art, this especially means that the invention allows users to register a mobile or immobile device to a wireless ad-hoc network by using a mechanism that allows a user to audio-visually verify the identity of the device to be registered and of the mobile or immobile device that shall allow the device to be registered to the network without the need for the user to enter a secret code to any of these two devices. In FIG. 1, the invention and the prior art are compared with regard to a number of characteristics.

BRIEF DESCRIPTION OF THE DRAWINGS

Further advantages and possible applications of the present invention result from the subordinate claims as well as from the following description of the preferred embodiment of the invention which is depicted in the following drawings:

FIG. 1 shows a table wherein characteristics of conventional wireless standards according to the state of the art are compared to the present invention.

DETAILED DESCRIPTION OF THE PRESENT INVENTION

In the following, the preferred embodiment of the present invention as depicted in FIGS. 1 to 5 shall be explained in detail. The meaning of the depicted symbols and their corresponding reference signs can be taken from an annexed table.

Figure 4:
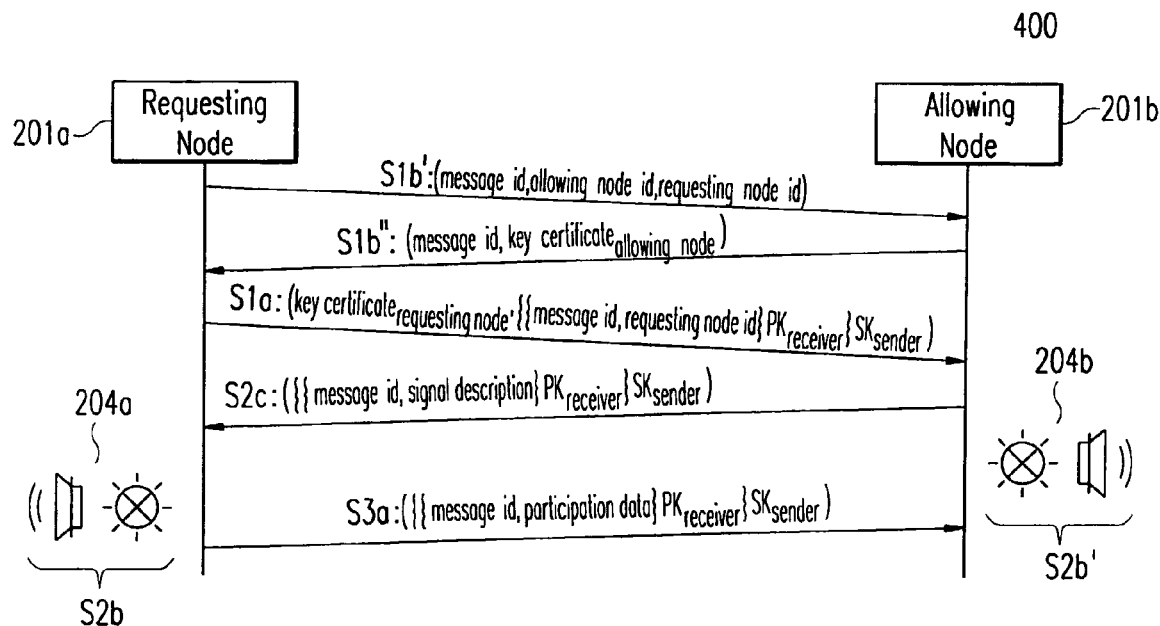
FIG. 4 shows a UML interaction diagram illustrating the normal flow of the registration protocol according to the present invention.
Figure 5:
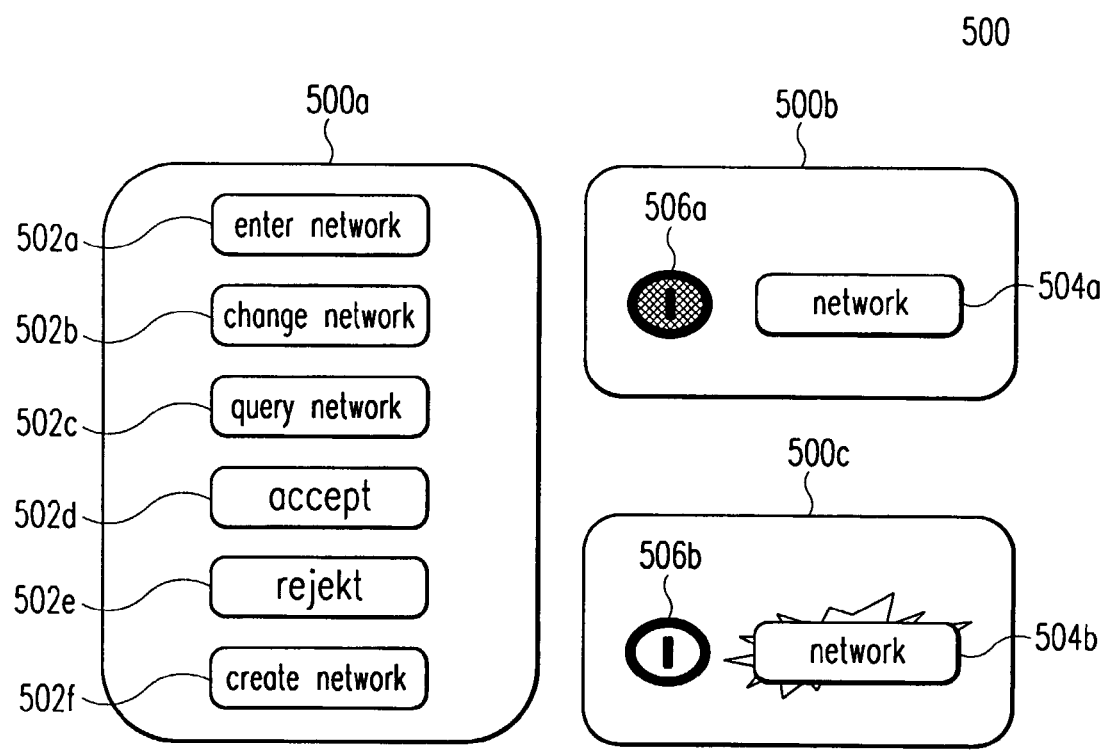
FIG. 5 shows two possible realizations of the user interaction unit (UIU) at the "requesting node" according to the present invention.

One embodiment of the present invention refers to a method for registering a user's wireless communication device 201a before allowing said device 201a to enter a wireless multi-hop ad-hoc network and participate in communication with wireless nodes 201b+c connected to the network as depicted in FIG. 4. For this purpose, said device 201a wirelessly transmits (S1a) a registration request message to all these wireless nodes 201b+c and determines the nearest wireless node 201b in its environment being authorized to register (S3a) said device 201a to the network.

In order to prevent man-in-the-middle-attacks, the wireless communication device 201a now starts a protocol that ensures that only the said device 201a can register at nodes in the environment for a certain time interval. To that end, said device 201a monitors the environment to detect other nodes. After a certain time interval, said device 201a sends out "voting messages" to the detected nodes. Only if all detected devices answer with a "yes" vote, the registration process is continued by said device 201a, else it is stopped.

In case the registration process continues, the following steps are executed for registering the wireless communication device 201a to a wireless multi-hop ad-hoc network using the authorized wireless node 201b: First, said wireless communication device 201a wirelessly transmits (S1b') a request message to the wireless node 201b for demanding a public-key certificate proving the authentication of said wireless node 201b and their authorization for registering the wireless communication device 201a to said network. After that, said device 201a waits for wirelessly receiving (S1b") a response message from the authorized wireless node 201b, said message containing the public-key certificate of said wireless node 201b.

In case the wireless communication device 201a and/or the wireless node 201b register (S5a) the lack of an acceptance or rejection message after a preprogrammed time interval has expired, the authentication and registration process will be terminated (S5b).

A further aspect of the present invention pertains to an identification (S6) of registered devices 201b+c of a specific wireless multi-hop ad-hoc network by decrypting (S6a) and recognizing (S6b) a network-identifying signal generated by a wireless node 201b connected to said network. This network-identifying signal can e.g. be a pure acoustic signal, a pure optical signal or an audio-visual signal.

A second embodiment of the invention specially refers to a wireless communication device 201a to be registered (S3a) to the wireless multi-hop ad-hoc network. Thereby, said device comprises the following components (cf. FIG. 2):

user interaction and control means 202a and 206a for controlling the registration and authentication process, processing means 208a for determining (S1b) the nearest wireless node 201b in the environment of the wireless communication device 201a being authorized to register (S3a) said device 201a to the network by evaluating wirelessly received response messages from said nodes 201b+c, decryption means 210a for decrypting (S2a) information wirelessly received from, audio-visually signaled and encrypted by the authorized wireless node 201b by means of a public/private key pair out of which the secret key is known to the wireless communication device 201a and the public key is known to the authorized wireless node 201b, and signaling means 204a for audio-visually signaling (S2b) said information to authenticate the identity of the wireless communication device 201a.

Instead of using a single static signal at the "requesting node" and at the "allowing node", a possible extension of the above-described method uses a dynamic audio/video signal, e.g. one that is randomly chosen for every registration attempt among a large space of possible signals. This signal, chosen by the "allowing node", is then played both at the "allowing node" and the "requesting node". This may mean that the signal is not played exactly in the same way at both devices (as their AVOUs might be realized differently) but in a similar way such that the user is able to recognize that both reproductions shall refer to the same signal.

As a result of this extension, security is enhanced as it is not enough for an attacker to find a way to let the allowing or the "requesting node" play the signal. Instead, he/she has to find a way to play the right signal at the corresponding node.

In order to realize this extension, the above-described mechanism can be extended as follows:

The start test message contains a random signal description. This message is encrypted with the public key of the "requesting node", thus allowing only the "requesting node" to know the content of the message.

After having received and decrypted the start test message, the "requesting node" plays out the signal specified in the start test message by using the AVOU. Now, the user verifies that the signal played out at the "allowing node" and the one at the "requesting node" refer to the same signal.

If the signal played out at the "allowing node" and the one at the "requesting node" do not refer to the same signal, the user either starts the action "reject query of another device to join my network" at the "allowing node" or does not start any further action. If the user has started said action, the RCU of the "allowing node" sends a rejection message to the RCU of the "requesting node" by using the WCU. If the user has not started any action, the RCU of the "requesting node" registers the lack of an acceptance or rejection message after a certain time interval and stops the registration process. In this case, also the RCU of the "allowing node" registers the lack of a user action after said time interval and stops the registration process. After that, the registration process is finished, and the "requesting node" is not part of the same network as the "allowing node".

According to the described extension, all devices have the same capability of playing a given sound or displaying a text or an image. Unfortunately, giving today's vast range of consumer electronics equipment and appliances, this might not be the case. Therefore, registration might fail because a device is not able to play the signal provided by the authoring node.

The extension described above can be improved by the following optional technique: When sending the registration request message, the "requesting node" can put a list of its capabilities into the message. Said capabilities describe which type of multimedia data the node is able to display. Upon receiving the request, the authoring node can ensure that the signal it wants to play out matches the capabilities of the device. Of course, this requires a general agreement on how to describe device capabilities. It can be e.g. as coarse-grained as differentiating audio and video or as fine-grained as considering media formats that can be played by the device. Alternatively, the protocol between the requesting and "allowing node" can be modified in the following way: When receiving the reply from the "allowing node", the "requesting node" can examine the provided "random signal". In case the device has no capability to play the signal, it can send a "reject signal" message back. In this case, the "allowing node" sends a new message with a changed signal that might better fit to the other node capabilities.

After the user has started the action "query my current network" in the UIU of a wireless node, the AVOUs of all nodes in the same network are used to play the same signal, such that the user can see which devices are currently a member of this network.

After the user has started the action "create a new network" in the UIU of a node, the RCU creates a new network containing this node as the only member.

For the above-described method the use of a protocol, called ensuring protocol, is proposed that ensures that only one registration process is running. Such a protocol can be realized in different ways. One of these protocols is illustrated by the interaction diagram depicted in FIG. 3. As shown in this figure, the presented protocol consists of three phases: First, all nodes in the neighborhood are stated and their public key certificates are retrieved. Second, a special voting protocol is used to ensure that all of the nodes in the neighborhood are aware of the currently executed registration process. Finally, the "stop phase" informs all the participating nodes about the end of the currently executed registration process and ensures that another process can be started again.

The first phase is called the "initial phase". As a prerequisite, every node acting as a "requesting node" ensures that it is fulfilling this role only for one registration process at a time. In order to start the protocol, the "requesting node" surveys the neighborhood for a certain time period in order to state all nodes of this neighborhood. The neighborhood of a node consists of all nodes this node can communicate with directly. In a beacon-based wireless ad-hoc network, the time period is e.g. of such a length that all nodes have to send their beacons at least once.

After having stated the neighborhood, the "requesting node" queries a public key certificate for every stated node if this certificate is not already contained in the corresponding beacon. This query can be done by using the corresponding node itself or by (at least partially) using another node that stores these certificates. Now the "voting phase" can be entered.

In the second phase that is the "voting phase", the "requesting node" sends a "request for voting" message to every stated node in the neighborhood. This message consists of a "request for voting" message ID, the ID of the "requesting node", a random secret value specific for the "voting phase", and the public key certificate of the "requesting node", all encrypted with the public key of the corresponding receiver.

Each receiver decrypts this message and sends a "response" message. This response contains the "response" message ID, the ID of the "requesting node", the answer (i.e. 'yes' or 'no') and the secret value of the "request for voting" message. The answer of a receiver is 'yes' if the receiver is not aware of any other registration currently ongoing, and 'no' else. The "response" message, encrypted with the public key of the "requesting node", is sent back to the "requesting node".

The "requesting node" then decrypts the "response" messages. If all votes are 'yes', the protocol states that only one registration process is currently executed and signals this to the registration process (which is then continued).

Figure 2:
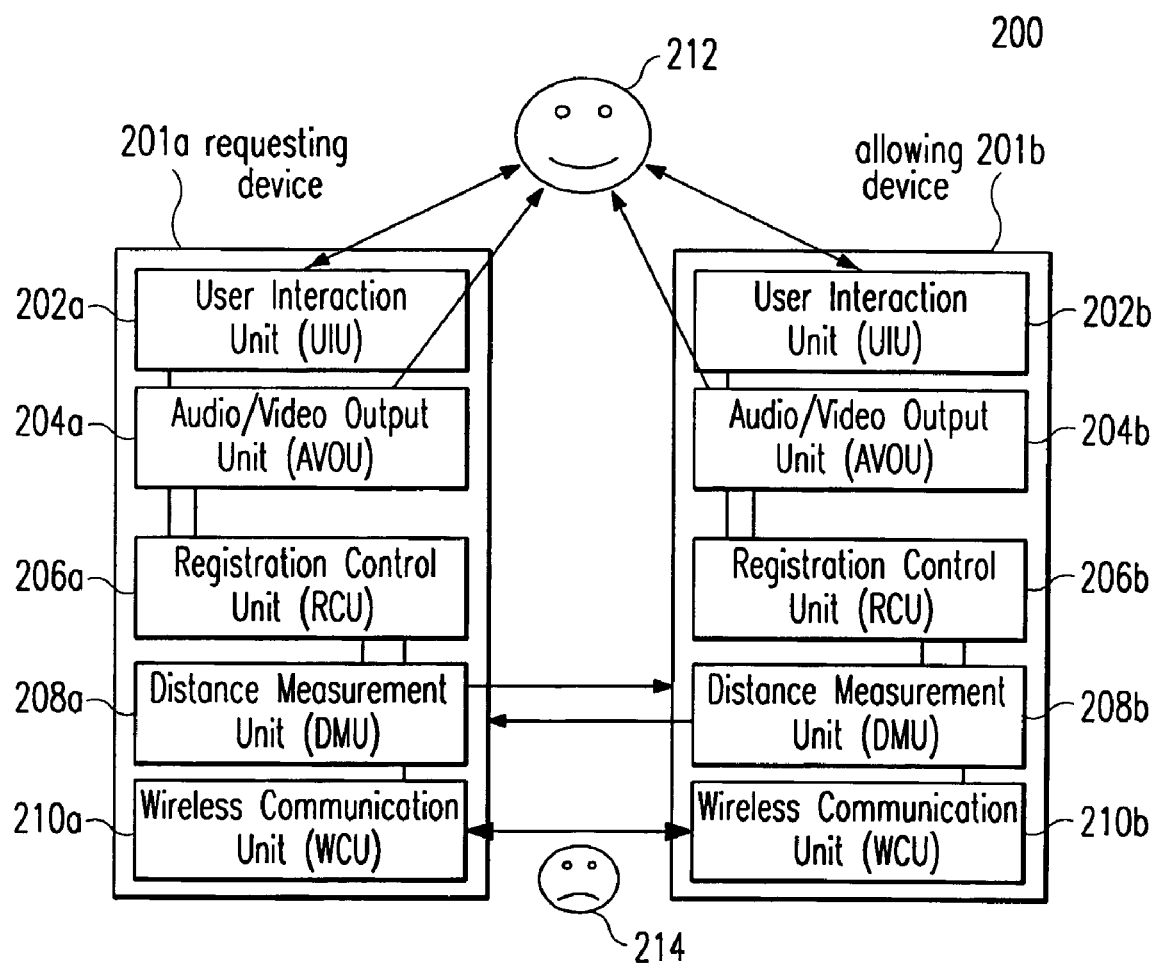
FIG. 2 is a wireless ad-hoc scenario showing the system components of a wireless communication device that wishes to participate to a multi-hop ad-hoc network ("requesting node") and a node that decides whether to allow a "requesting node" participating to a network or not ("allowing node")
Figure 3:
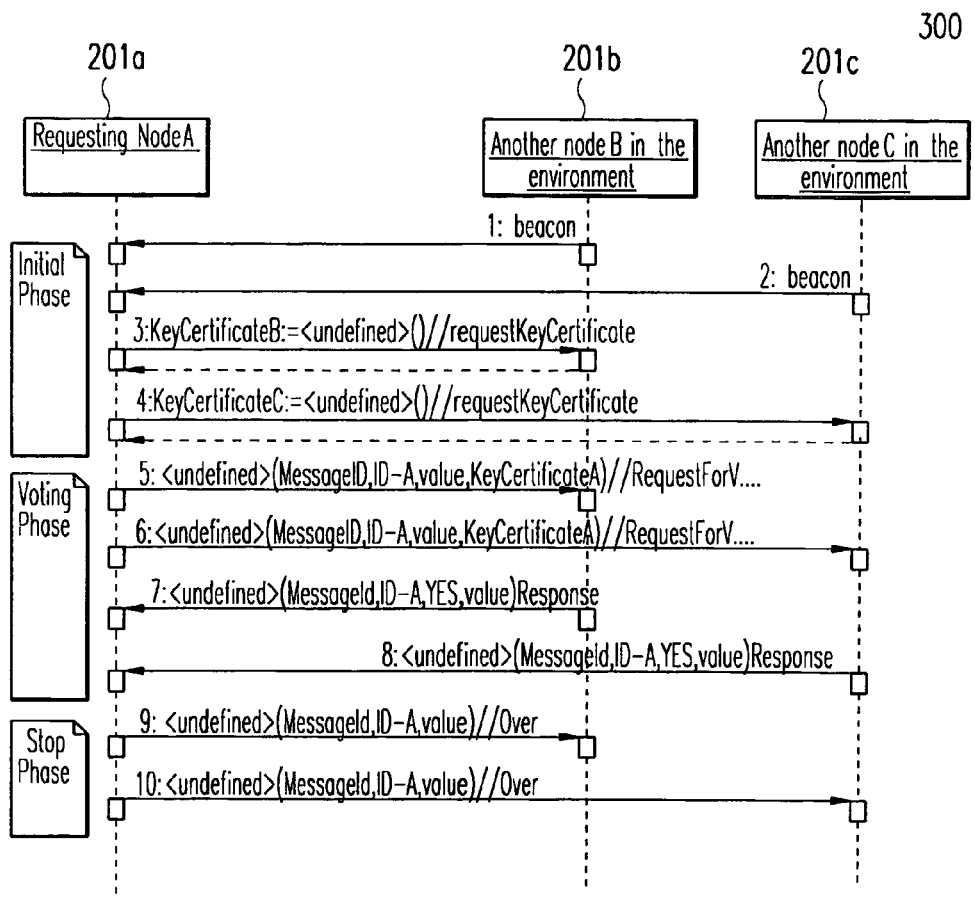
FIG. 3 shows a UML interaction diagram illustrating the normal flow of the ensuring protocol according to the present invention.

All nodes that have voted for one registration process must react only to such registration protocol messages where the ID of the "requesting node" is equal to the ID of the "requesting node" in the ensuring protocol (cf. ID-A in FIG. 3).

If there is at least one 'no' vote or if not all votes can be gathered in a certain time period, the "requesting node" sends out "over" messages (see below), waits a random time interval and tries again to start the "voting phase" while during the waiting interval states possible additional nodes. If a certain number of "voting phases" fail, the entire protocol process is canceled and an error message is returned (thus also canceling the registration process that waits on this protocol process).

In the third and last phase that is the "stop phase", when the registration process is finished, the "requesting node" sends "over" messages to all nodes in the neighborhood. These messages are encrypted again with the public key of the corresponding receivers and contain the ID of the "requesting node", the secret value from the "request for voting" message and an "over" message ID. After having received this message, each node can vote again for another registration process. This state at each node is also reached when a certain time interval after each 'yes' vote is passed without a message concerning this registration process.

A complete registration mechanism has to state how it realizes the following use cases. In the following sections it is briefly described how the present invention is covering these use cases.

Entering a network without being in a network before: This use case is started with the action "enter network without being in a network before". It is done unless the intended "allowing node" is used. The registration mechanism is continued with use case "accept a new device" or "reject a new device".

Changing the network: This use case is started with the action "change network". It is done again unless the intended "allowing node" is used. The registration mechanism is continued with use case "accepting a new device" or "rejecting a new device".

Unintentionally changing the network: This is a negative use case, i.e. an unwanted one. In the present invention, this use case is equal to the use case "changing the network". The point is that it is unlikely that a network is changed without an intention, as several actions have to be done in the correct order.

Unintentionally entering a network: This is a negative use case, i.e. an unwanted one. In the present invention, this use case is equal to the use case "entering a network without being in a network before". The point is that it is unlikely that a network is entered without an intention, as several actions have to be done in the correct order.

Maintaining the network: In this use case a user simply switches on his/her device as normal.

Querying the currently used network: This use case is started with the action "query my current network".

Accepting a new device: This use case is started with the action "accept query of another device to join my network".

Rejecting a new device: This use case is started with the action "reject query of another device to join my network".

Creating a new network: This use case is started with the action "create a new network".

In the following section the aforementioned messages, which are used for the proposed registration protocol, will be examined further. Thereby, the following notation is used:

( . . . ) denotes a message,

{ . . . }$PK_X$ denotes some data encrypted with the public key of node X. This means that only node X is able to decrypt the data by using his/her secret key, and { . . . }$SK_X$ denotes some data signed with the secret key of node X. This means that everybody is able to decrypt this message, but only node X can have created it.

In the following, five method types which are used in the proposed registration protocol according to the present invention shall briefly be described: key certificate request message, key certificate response message, registration request message, start test message, and acceptance message.

The key certificate request message contains the message ID (i.e. KEY CERTIFICATE REQUEST MESSAGE), the ID of the "allowing node" (from whom the key certificate is needed), and the ID of the "requesting node" (to whom the key certificate shall be sent):

Requesting node→Allowing node: (message ID, allowing node ID, requesting node ID)

In principle, any node that knows this key certificate can answer to this request. This message can also be part of another protocol, e.g. a PKI protocol.

The key certificate response message contains the message ID (i.e. KEY CERTIFICATE RESPONSE MESSAGE), and the key certificate of the "allowing node" containing the public key of the "allowing node" signed by a certain authority whose signature can be checked by any node.

Allowing node→Requesting node: (message id, key certificate$_{allowing\ node}$)

This message can also be part of another protocol, e.g. a PKI protocol.

The registration request message contains two parts. The first part is the key certificate of the "requesting node". The second part consists of the message ID (i.e. REGISTRATION REQUEST MESSAGE), the ID of the "requesting node", and a random value. This second part is encrypted with the public key of the "requesting node", i.e. the receiver, thus allowing only the "allowing node" to read the content of the message.

Requesting node→Allowing node: (key certificate$_{reqesting\ node}$, {{message ID, requesting node ID, random value}$PK_{receiver}$}$SK_{sender}$)

This message again is signed by the sender (by using its secret key). The "allowing node" must not react to such messages where the "requesting node" ID differs from the ID in the key certificate or differs from the ID the "allowing node" has voted for in the ensuring protocol. Please note that by e.g. the use of a more general PKI protocol, the key certificate part can be omitted and replaced by message of the PKI protocol.

The start test message contains the message ID (i.e. START TEST MESSAGE), an optional random signal description, i.e. a value describing the test signal, and the random value received in the Registration Request Message. If existing, the signal description value is chosen randomly among a suitably large value space (in order to prevent that the attacker tries to guess the value). The message is encrypted with the public key of the "requesting node", i.e. the receiver, thus allowing only the "requesting node" to read the content of the message.

Allowing node→Requesting node: ({{message ID[, signal description], random value}$PK_{receiver}$}$SK_{sender}$)

This message again is signed by the sender (by using its secret key).

The acceptance message contains the message ID (i.e. ACCEPTANCE MESSAGE), some participation data, and the random value received in the registration request message.

Allowing node→Requesting node: ({{message ID, participation data, random value}$PK_{receiver}$}$SK_{sender}$)

The participation data allows the "requesting node" to participate to the network of the "allowing node". Depending on the security mechanisms the wireless ad-hoc network uses, this data can differ. In a network where e.g. a commonly known key is the secret every member of this network shares, the participation data contains this key. In a network that is based on a "passport" system, this participation data contains the passport, and so on. The message is encrypted with the public key of the "requesting node", i.e. the receiver, thus allowing only the "requesting node" to read the content of the message. This message again is signed by the sender (by using its secret key).

There are several possibilities to realize the actions performed in the UIU. One possibility is to provide basically one button per action (see FIG. 5a). Another possibility is to use only two buttons: an on/off switch and a "network button"

with two states, visualized e.g. by a light inside the button (see FIG. 5b for the two buttons in the unlit state and FIG. 5c for the two buttons in the lit state). In the following, it is briefly described how the aforementioned actions could be mapped to uses of these two buttons.

"Enter network without being in a network before": For executing this action, a user has to press the "network button" once when the light is off.

"Change network": For executing this action, a user has to press the "network button" once when the light is off.

"Query my current network": For executing this action, a user has to keep pressing the "network" button when the light is off.

"Accept query of another device to join my network": For this purpose, a user has to press the "network button" once when the light is off.

"Reject query of another device to join my network": In this case, nothing has to be done.

"Create a new network": For executing this action, a user has to simultaneously press the on/off switch and the "network button" when the light is off.

In the following, the registration approach according to the present invention will be illustrated from a user's point of view in connection with the user interaction unit (UIU).

The registration process starts when the user presses the "registration" button at the requesting node. The system now selects a node in the environment that is already member of a a priori different network as the allowing node. If there are different nodes that could be used for this purpose, the selection criteria can be for example a minimum in the number of hops to that node or, if available, the minimum distance to a node. Now, both the requesting and the allowing node audiovisually signal to the user that a registration is possible, for example by letting the display blink and by emitting some sound. If the allowing device that signals is not the one the user wants to use, he/she presses the registration button at the requesting node again. The same remains true if the user does not see any allowing device signalling, e.g. because the system selected the stereo in the other flat. The system now selects another device at the allowing node, and again both devices signal this fact to the user. If now the allowing device was selected the user wanted to use, he/she presses the "registration" button at the allowing device. Afterwards, the requesting device is a member of the network of the allowing device.

For implementing different parts of the invention the following technologies can be used:

Public Key Cryptography: For en-/decrypting and signing/verifying purposes, advantageously a public key cryptosystem can be used (either directly for encryption or, as it is done normally for enhancing the performance, for encrypting a symmetric session key that is used for symmetric encryption and decryption of data). This aspect also concerns required public key certificates as mentioned above. For this purpose, any public key cryptosystem (such as RSA or El-Gamal) available on the market can be used.

Symmetric Cryptography: For encrypting purposes, alternatively a symmetric cryptosystem (e.g. AES) can be used. To this purpose, all occurrences of "encryption with a public key" and "decryption with a private key" have to be replaced by a "generate and exchange a key for a secure connection between A and B", a "encryption with the generated key", and "decryption with the generated key", respectively. Additionally, occurrences of "sending a Public Key Certificate" can be replaced by a "generate and exchange a key for a secure connection between A and B". For key exchange, e.g. a (known) Diffie-Hellmann mechanism can be used.

Distance Measurements: For the DMU, different techniques can be employed in order to measure the distance between two nodes in the wireless ad-hoc network. If the wireless transmission technology already allows distance measurements of the needed accuracy (here the requirement is that, prior to the registration, the different other nodes can be ordered according to their distance to a certain node), normally this possibility will be used. In other cases, e.g. the following technology can be used for any of the signal propagation techniques radio and ultrasonic sound:

Time Of Arrival (ToA) Measurements: For ToA measurements one device measures the time it takes for a signal from another device to this device. This time period is then calculated into a distance. In order to be able to measure this time, the clocks of these two devices need to be as synchronous as possible.

| Terms and Definitions | |
|---|---|
| Technical Term | Brief Explanation |
| Registration (Process) | A mechanism that allows nodes that are not yet participating to a network to participate in this network under certain circumstances. |
| Requesting Node | The node that wishes to participate to a certain network. |
| Allowing Node | The node that decides whether to allow a „requesting node„ participating to a network or not. |
| (Sanctioning) User | A user who, for manual registration purpose, is able to sanction the participation of a node. |
| Attacker | A possible role for a party that tries to execute an attack against the registration process. |
| Manual Registration | A registration variant that uses a sanctioning step by a user who decides whether the „requesting node„ shall be allowed to the network or not. |
| Automatic Registration | A registration variant that does not involve the user in deciding whether to allow the „requesting node„. |

| Depicted Features amd their Corresponding Reference Signs | |
|---|---|
| No. | Technical Feature |
| 100 | table wherein characteristics of conventional wireless standards according to the state of the art are compared to the present invention, |
| 200 | wireless ad-hoc scenario showing the system components of a wireless communication device 201a that wishes to participate to a wireless multi-hop ad-hoc network („requesting node„) and a node 201b that decides whether to allow a „requesting node„ participating to a network or not („allowing node„) |
| 201a | „requesting node„ in the wireless ad-hoc scenario 200 |
| 201b | „allowing node„ in the environment of the „requesting node„ 201a, which already participates to said network |
| 201c | another node in the environment of the „requesting node„ 201a, which already participates to said network |
| 202a | User Interaction Unit (UIU) of the „requesting node„ 201a |
| 202b | User Interaction Unit (UIU) of the „allowing node„ 201b |
| 204a | Audio/Video Output Unit (AVOU) of the „requesting node„ 201a |
| 204b | Audio/Video Output Unit (AVOU) of the „allowing node„ 201b |
| 206a | Registration Control Unit (RCU) of the „requesting node„ 201a |

-continued

| No. | Technical Feature |
|---|---|
| 206b | Registration Control Unit (RCU) of the „allowing node„ 201b |
| 208a | Distance Measurement Unit (DMU) of the „requesting node„ 201a |
| 208b | Distance Measurement Unit (DMU) of the „allowing node„ 201b |
| 210a | Wireless Communication Unit (WCU) of the „requesting node„ 201a |
| 210b | Wireless Communication Unit (WCU) of the „allowing node„ 201b |
| 212 | user of the „requesting node„ 201a and of the „allowing node„ 201b who sanctions a registration to the wireless ad-hoc network |
| 214 | attacker between the „requesting node„ 201a and the „allowing node„ 201b who relays the messages between these parties, thus being able to interfere and to read the communication |
| 300 | UML interaction diagram illustrating the normal flow of the ensuring protocol according to the present invention |
| 400 | UML interaction diagram illustrating the normal flow of the registration protocol according to the present invention |
| 500 | two possible realizations of the user interaction unit (UIU) at the „requesting node„ 201a according to the present invention |
| 502a | „enter network„ button according to said first realization of the UIU 202a |
| 502b | „change network„ button according to said first realization of the UIU 202a |
| 502c | „query network„ button according to said first realization of the UIU 202a |
| 502d | „accept„ button according to said first realization of the UIU 202a |
| 502e | „reject„ button according to said first realization of the UIU 202a |
| 502f | „create network„ button according to said first realization of the UIU 202a |
| 504a | network button according to said second realization of the UIU 202b in an unlit state |
| 504b | network button in a lit state |
| 506a | on/off switch according to said second realization of the UIU 202b in an unlit state |
| 506b | on/off switch in a lit state |
| S1a | step #1a: wirelessly transmitting a registration request message to all wireless nodes 201b + c connected to the network |
| S1b | step #1b: getting the public-key certificate of the wireless node 201b |
| S1b' | step #1b': wirelessly transmitting a request message to all wireless nodes 201b + c in the environment of the wireless communication device 201a for demanding a public-key certificate |
| S1b'' | step #1b'': wirelessly receiving a response message from an authorized wireless node 201b, said message containing the public-key certificate of said wireless node 201b |
| S2 | step #2: authenticating said device 201a by decrypting (S2a) and audio-visually signaling (S2b) information wirelessly received (S2c) by the authorized wireless node 201b, thereby using a public/private key pair |
| S3a | step #3a: registering said device 201a |
| S4 | step #4: wirelessly sending a registration acceptance or rejection message depending on whether an audio-visual signal is generated by the wireless communication device 201a and by the authorized wireless node 201b, respectively |
| S5a | step #5a: registering the lack of an acceptance or rejection message after a preprogrammed time interval has expired |
| S5b | step #5b: terminating the authentication and registration process |

The invention claimed is:

1. A method for registering and authenticating a wireless communication device with a wireless ad-hoc network, the method comprising:
wirelessly transmitting a registration request message from a requesting device to a node authorized to register the requesting device to the network;
monitoring an environment of the requesting device to detect other nodes;
sending out voting messages to the detected nodes to ensure that only the requesting device can register at nodes in the environment for a preprogrammed time interval;
authenticating the requesting device towards a user by playing an audio-visual signal,
authenticating the authorized node towards the user by playing an audio-visual signal;
sanctioning registration by the user in a case the requesting device and the authorized node playing the audio-visual signal are ones the user intended to use; and
wirelessly transmitting a registration message in a positive case from the authorized node to the requesting device.

2. A method according to claim 1, further comprising:
in a case the wireless communication device and/or the wireless node registers lack of an acceptance or rejection message after a preprogrammed time interval has expired, terminating the authentication and registration process.

3. A method according to claim 1, wherein:
the audio-visual signals by the wireless communication device and by the authorized wireless node have a common structure out of a large number of possible structures so the user can make a sanctioning decision dependent on whether both signals have the same structure, and
the description of the audio-visual signal to be signaled by the requesting device is wirelessly sent by the authorized node in an encrypted way, so only the requesting device can decrypt the description.

4. A method according to claim 1, further comprising:
identifying registered devices of a specific wireless multi-hop ad-hoc network by decrypting and recognizing a network-identifying signal out of a range of different possible signals that is specific for the network generated by a wireless node connected to the network.

5. A method according to claim 4, wherein
the network-identifying signal is an audio signal.

6. A method according to claim 4, wherein
the network-identifying signal is a visual signal.

7. A method according to claim 4, wherein
the network-identifying signal is an audio-visual signal.

8. A method according to claim 1, wherein
the registration request message contains a list containing device capabilities of the wireless communication device to be registered.

* * * * *